Patented Mar. 8, 1932

1,848,650

UNITED STATES PATENT OFFICE

GEORG OSTERTAG, OF BASEL, SWITZERLAND, ASSIGNOR TO THE FIRM "DURAND & HUGUENIN S. A.," OF BASEL, SWITZERLAND

MORDANT DYESTUFFS AND PROCESS OF MAKING SAME

No Drawing. Application filed December 29, 1927, Serial No. 243,475, and in Germany January 10, 1927.

It has been found that valuable mordant dyestuffs can be obtained by diazotizing an amino-azo body of the following general formula:

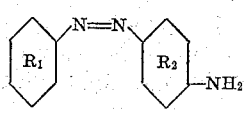

wherein $R_1$ represents a benzene nucleus having a hydroxyl and a carboxyl group in ortho position to each other and $R_2$ represents a benzene or naphthalene nucleus which, apart from the amino group in para position to the azo group, may contain as further substituents in any position negative salt forming groups, such as for instance sulpho or carboxyl groups, and by treating the diazo compound in an alkaline medium, for example with sodium carbonate, ammonia or the necessary proportions of dilute caustic soda lye. When such a diazo compound is treated with an alkaline agent, there is first formed a deep blue solution. This colour disappears after a short time and a brown solution is finally obtained, from which the new dyestuff can be separated by acidification or by salting out. By this treatment with an alkaline agent the diazo compound gradually loses its coupling power. The reaction is terminated, when it has disappeared, that is to say, when a test of the solution does no more react upon an azo coupling component, such as resorcinol (or resorcin) or $\beta$-naphthol-3:6-disulphonic acid. In this way, for instance, the amino azo dyestuff: 4-amino-2-sulpho-benzene-azosalicyclic acid of the formula:

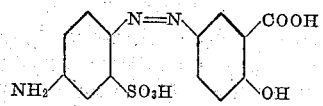

can be diazotized and the formed diazo compound be treated with alkali until it has lost the property of coupling.

C. Bulow (Berliner Berichte, Vol. 44, page 601 and following) records the observation that the diazo compound from para-amino-benzene-azo-salicylic acid assumes an intense blue colour on addition of sodium carbonate solution, that this blue colour is permanent for a long time in the cold, that by passing carbon dioxide into the solution the colour changes from blue to yellow brown and that the diazo compound in this manner is in no way destroyed. It is not stated what bodies exist in this solution.

By Griess (see Annalen der Chemie Vol. 137, pages 78 to 82, 1866) and by Cain ("Diazocompounds" pages 67 and 68, 1920) the action of alkalies on single diazo compounds such as diazobenzene nitrate, -sulphate, -perbromide and others has been disclosed. It is pointed out therein, that the materials subjected to such a treatment are decomposed and yield unstable products, more or less explosive and contain besides others diazo-amino, azimino, etc. groups. The present invention, contrarily to the cited researchworks, relates to the treatment with an alkaline agent of specific amino-azo-compounds, therefore of quite another structure, than the starting materials used by Griess and Cain. The nature of the reaction on the diazo group of such bodies must be a different one. The new bodies obtained are of valuable mordant dyeing properties. They do not contain either explosives, or diazo amino or azimino or other unstable groups with which they would be of no use as dyestuffs.

From the above cited publications it cannot be deduced what may be the essence of the present invention, that is to say, that valuable mordant dyestuffs can be obtained by treating the diazo derivative of an amino-azo compound of the above cited type with an alkaline agent until its faculty of coupling has disappeared.

The dyestuffs thus obtained constitute brown powders, being in form of their alkali metal salts soluble in water with brown colour, which solution on the addition of caustic soda lye turns to brown red and from which solution an addition of diluted hydrochloric acid separates out brown-black flakes, said dyestuffs dissolving in concentrated sulphuric acid to a dark violetish-brown to violet solution and dyeing chromium mordanted fibre fast mainly brown shades.

It has not yet been found exactly what happens to the diazo body in this treatment with alkali. It seems that the reaction does not consist in a simple substitution of the diazo group by hydroxyl, but is of a more complicated nature and that the resulting azo dyestuffs contain—besides the nitrogen being present in the azo groups,—more nitrogen, but not in form of chromophoric group.

The following examples illustrate the invention, the parts being by weight.

*Example I*

337 parts of 4-amino-2-sulpho-benzene-azo-salicylic acid (made for example by interaction of the diazo compound of para-nitraniline-ortho-sulphonic acid with salicylic acid and reduction of the nitro group in the monoazo dyestuff) having the formula:

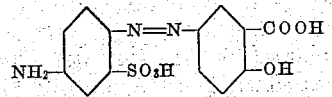

are diazotized as usual the diazotization taking place at the amino group. The brownish-yellow mass of crystals which is formed constitutes the diazo compound and is filtered, and then stirred with water. The mixture is then made alkaline with ammonia and stirred at the ordinary temperature until the deep blue colour has disappeared and the solution is brown. The solution is acidified and the precipitated dyestuff filtered and dried. It dissolves in the form of the free dyestuff acid in water to a brown solution. When chrome printed on cotton it yields reddish brown tints of good fastness.

*Example II*

257 parts of 4-amino-benzene-azo-salicylic acid (made for example by coupling of the diazo compound of mono-acetyl-para-phenylene-diamine with salicylic acid and by saponification of the acetyl group or by coupling of the diazo compound of para-nitraniline with salicylic acid and by reduction of the nitro group in the azo dyestuff so obtained) having the formula:

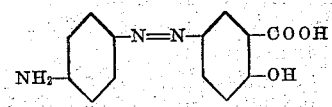

are diazotized as usual, the diazotization taking place at the amino group. The diazo body is stirred with water and made alkaline with ammonia and stirred at ordinary temperature until the deep blue coloration has disappeared and the solution is brown. The new dyestuff is salted out, filtered off and dried.

When printed with chrome mordant on cotton it yields fast brownish tints.

*Example III*

351 parts of 4-amino-2-sulpho-benzene-azo-meta-cresotinic acid (made for example by interaction of the diazo compound of acetyl - para - phenylene - diamine-sulphonic acid with meta-cresotinic acid and saponifying the acetyl group) having the formula:

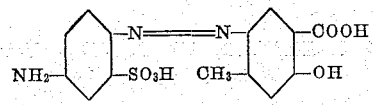

are diazotized in the usual manner, the diazotization taking place at the amino group. The diazo compound is filtered, stirred with water and the mixture made alkaline by addition of ammonia. The whole is stirred at the ordinary temperature until the deep blue colour disappears and a brown solution is produced. The dyestuff is separated by addition of acid. It resembles that made according to Example I. In chrome printing it yields a somewhat more reddish tint, however.

In a quite analogous manner a similar dyestuff is obtained from 4-amino-2-sulpho-benzene-azo-ortho-cresotinic acid.

*Example IV*

301 parts of 4-amino-2-carboxyl-benzene-azo-salicylic acid (made from the azo dyestuff from anthranilic acid and salicylic acid by nitration and reduction of the nitro group) having the formula:

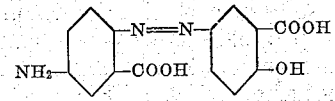

are diazotized in the usual manner the diazotization taking place at the amino group. The diazo compound is filtered, stirred with water and the mixture made alkaline with ammonia. The solution is stirred at the ordinary temperature until the deep blue color has changed to brown. The dyestuff thus formed, in contrast with the products which contain a sulphonic group, is sparingly soluble in the form of free dyestuff acid and must be isolated in the form of its alkali salts. When chrome printed it yields brown tints which are more yellowish than those obtained with the product made according to Example I.

*Example V*

387 parts of the amino-azo dyestuff made from the diazo compound of para-amino-salicylic acid and Cleve-acid (α-naphthylamine-6 or 7-sulphonic acid) having the formula:

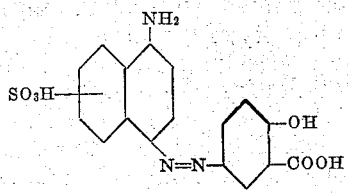

are diazotized in the usual manner the diazotization taking place at the amino group. This diazo body is stirred with water and the mixture made alkaline by addition of a sodium carbonate solution. The whole is stirred at ordinary temperature until the deep blue color has changed to brown and the development of nitrogen gas has ceased. The new dyestuff so formed is separated by addition of acid and common salt.

In chrome printing it yields fast brown tints.

In these examples, in place of ammonia, soda or the corresponding quantity of diluted soda lye or any other suitable alkaline agent can be employed.

What I claim is:—

1. A process for the manufacture of mordant dyestuffs, which consists in diazotizing an amino-azo compound corresponding to the following formula:

$$R_1.N=N.R_2.NH_2$$

wherein $R_1$ represents a benzene nucleus having a hydroxyl and a carboxyl group in ortho position to each other and wherein $R_2$ represents a benzene or naphthalene nucleus having an amino group in para position with respect to the azo group, and treating the formed diazo compound with an alkaline agent so as to produce, when its coupling power has disappeared, a new azo dyestuff containing probably besides the nitrogen being present in the azo groups, more nitrogen, but not in form of a chromophoric group.

2. A process for the manufacture of mordant dyestuffs, which consists in diazotizing an amino-azo compound corresponding to the following formula:

$$R_1.N=N.R_2.NH_2$$

wherein $R_1$ represents a benzene nucleus having a hydroxyl and a carboxyl group in ortho position to each other and wherein $R_2$ represents a benzene or naphthalene nucleus which contains an amino group in para position with respect to the azo group and has a negative salt forming group in any position, and treating the formed diazo compound with an alkaline agent, so as to produce, when its coupling power has disappeared, a new azo dyestuff containing probably besides the nitrogen being present in the azo groups more nitrogen, but not in form of a chromophoric group.

3. A process for the manufacture of mordant dyestuffs, which consists in diazotizing an amino-azo compound corresponding to the following formula:

$$R_1.N=N.R_2.NH_2$$

wherein $R_1$ represents a benzene nucleus having a hydroxyl and a carboxyl group in ortho position to each other and wherein $R_2$ represents a benzene or naphthalene nucleus which contains an amino group in para position with respect to the azo group and has a sulpho group in any other position, and treating the formed diazo compound with an alkaline agent, so as to produce, when its coupling power has disappeared, a new azo dyestuff containing probably besides the nitrogen being present in the azo groups, more nitrogen, but not in form of a chromophoric group.

4. A process for the manufacture of mordant dyestuffs, which consists in diazotizing para-amino-sulphobenzene-azosalicylic acid and treating the formed diazo compound with an alkaline agent, so as to produce, when its coupling power has disappeared, a new azo dyestuff containing probably besides the nitrogen being present in the azo groups, more nitrogen, but not in form of a chromophoric group.

5. A process for the manufacture of mordant dyestuffs, which consists in diazotizing para-amino-sulpho-benzene-azosalicylic acid and treating the formed diazo compound with ammonia so as to produce, when its coupling power has disappeared, a new azo dyestuff containing probably besides the nitrogen being present in the azo groups more nitrogen, but not in form of a chromophoric group.

6. As new articles of manufacture the herein described mordant dyestuffs obtained by diazotizing an amino azo compound corresponding to the following formula:

$$R_1.N=N.R_2.NH_2$$

wherein $R_1$ represents a benzene nucleus having a hydroxyl and a carboxyl group in ortho position to each other and wherein $R^2$ represents a benzene or naphthalene nucleus having an amino group in para position with respect to the azo group and by treating the formed diazo compound with an alkaline agent, said dyestuffs constituting brown powders being in form of their alkali metal salts soluble in water with brown colour, which solution on addition of caustic soda lye turns to brown red and from which solution an addition of diluted hydrochloric acid separates out brown-black flakes, said dyestuffs dissolving in concentrated sulphuric acid to a dark violetish brown to violet solution and dyeing chromium mordanted fibre fast mainly brown shades.

7. As new articles of manufacture the herein described mordant dyestuffs obtained by diazotizing an amino azo compound corresponding to the following formula:

$$R_1.N=N.R_2.NH_2$$

wherein $R_1$ represents a benzene nucleus having a hydroxyl and a carboxyl group in ortho position to each other and wherein $R_2$ represents a benzene or naphthalene nucleus having an amino group in para position with respect to the azo group and having a negative salt forming group in any other position and by treating the formed diazo compound with an alkaline agent, said dyestuffs constituting brown powders being in form of their alkali metal salts soluble in water with brown colour, which solution on addition of caustic soda lye turns to brown red and from which solution an addition of diluted hydrochloric acid separates out brown-black flakes, said dyestuffs dissolving in concentrated sulphuric acid to a dark violetish brown to violet solution and dyeing chromium mordanted fibre fast mainly brown shades.

8. As as new article of manufacture the herein described mordant dyestuff obtained by diazotizing para-amino-sulpho-benzene-azo-salicyclic acid and treating the formed diazo compound with an alkaline agent, said dyestuff constituting a brown powder being in form of alkali metal salts soluble in water with brown colour, which solution on addition of caustic soda lye turns to brown red and from which solution an addition of diluted hydrochloric acid separates out brown-black flakes, said dyestuff dissolving in concentrated sulphuric acid to a dark violet brown solution and dyeing chromium mordanted fibre fast brown shades.

In witness whereof I have hereunto signed my name this 19th day of December, 1927.

GEORG OSTERTAG.